No. 640,184. Patented Jan. 2, 1900.
A. DUFFNER, Jr.
AIR PROPELLER.
(Application filed Apr. 15, 1899.)
(No Model.)
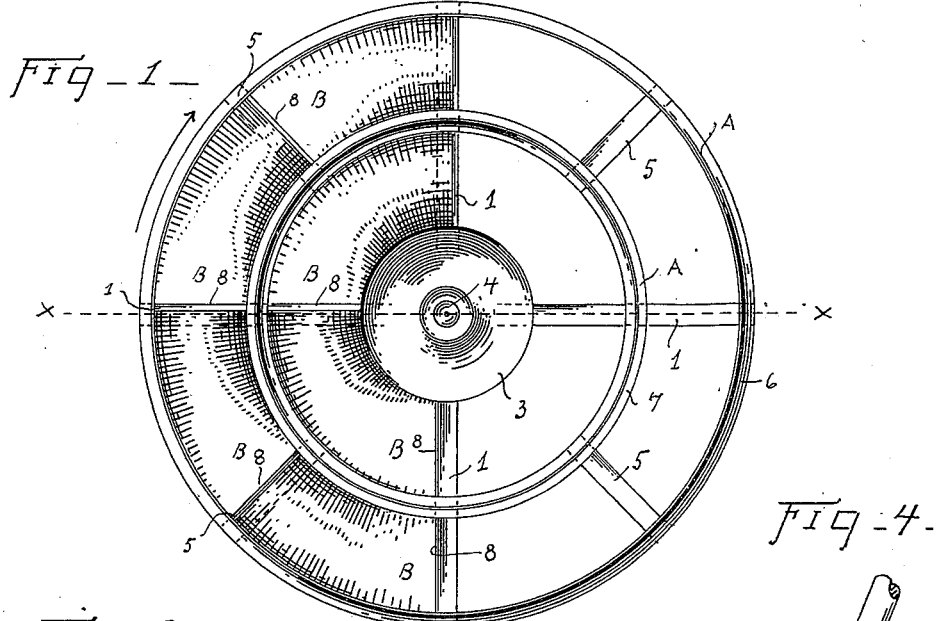
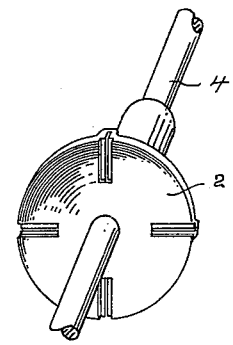
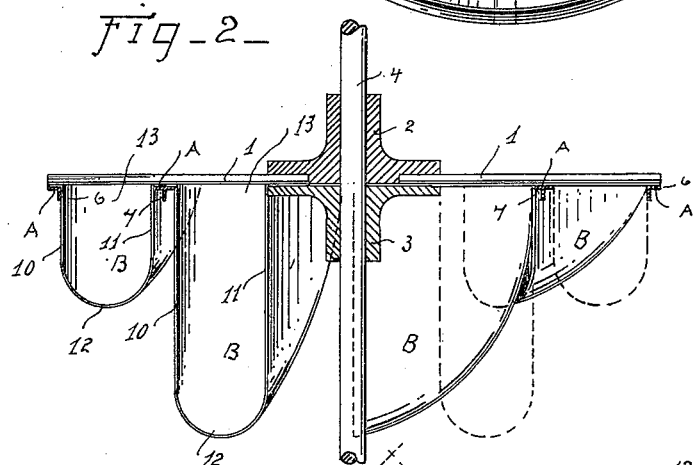
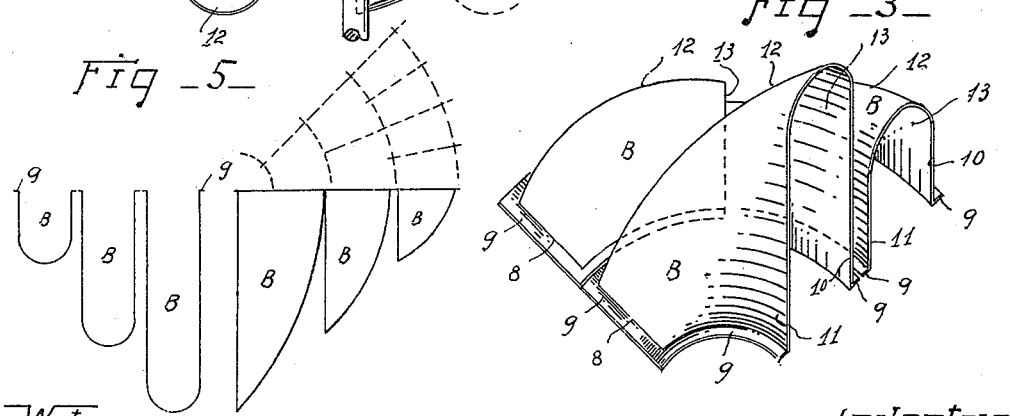
Witnesses
Herman H. Martin
Hattie Harris
Inventor
Andrew Duffner Jr,
By Robt B Wilson,
his Attorney.

UNITED STATES PATENT OFFICE.

ANDREW DUFFNER, JR., OF TOLEDO, OHIO.

AIR-PROPELLER.

SPECIFICATION forming part of Letters Patent No. 640,184, dated January 2, 1900.

Application filed April 15, 1899. Serial No. 713,110. (No model.)

*To all whom it may concern:*

Be it known that I, ANDREW DUFFNER, Jr., a citizen of the United States, residing at Toledo, in the county of Lucas and State of Ohio, have invented a new and useful Improvement in Air-Propellers, of which the following is a specification.

My invention relates to an air-propeller, and has for its object to provide a mechanical appliance of the above character adapted to deliver under pressure a maximum volume of gases with a minimum consumption and loss of power, and thereby effect a great saving in the cost of instalment and operation of an appliance designed for delivering and withdrawing gases for various purposes.

The object of my invention is accomplished by providing a device which comprises two or more series of buckets arranged in radial and concentric relations around a driven arbor whereby they are simultaneously revolved, the buckets being of such conformation that when revolved the radial flow of indrawn currents of gases induced by centrifugal action is intercepted by the inwardly-curved walls of the buckets, which causes the air to be discharged from each bucket in a plane at right angles to the plane of revolution, whereby the volume and pressure of gases delivered is greatly increased with a minimum consumption of power.

A further object is to prevent reverse or vortex currents of gases through the propeller when in operation, which I accomplish by providing two or more series of buckets of the kind described, concentrically secured to a revoluble spider, in which the buckets of the inner series, being fewer in number, are made of a relatively greater capacity than those of the outer series, whereby the volume and pressure of gases delivered from the central portion is approximately equalized with the outer portion, moving at a proportionately higher velocity, the capacity of the buckets of each series being increased from the outer to the inner in proportion as the velocity of each series is diminished.

In the drawings, Figure 1 is a front elevation of my invention. Fig. 2 is a section thereof on the line X X of Fig. 1. Fig. 3 is an isometric view of two series of buckets. Fig. 4 is an isometric view of a central disk. Fig. 5 is a diagrammatic view showing the application of my invention to propellers of increased capacity.

In carrying out my invention I preferably employ a spider comprising a plurality of concentric rims A, which are secured to radial arms 1, securely clamped between disks 2 and 3, adapted to be mounted upon the driven arbor 4, and intermediate the arms 1, which radiate from the center, the quadrants thus produced are bisected by radial arms 5, connecting the outer rims 6 to inner rims 7, and thereby divide the area of the circle into two or more series of concentric segments increasing in number, but decreasing in area, from the center toward the circumference.

B designates buckets which are suitably secured to the portions of the radial arms and rims defining the segmental areas to which the discharging ends 8 of the buckets are made to conform, and the buckets are provided with flanges 9 for such attachment by any suitable means. The buckets are preferably U-shaped in cross-section and comprise quadrant-shaped parallel sides 10 and 11, which are connected by a semicircular portion 12. From the inlet 13, which projects at a right angle to the outlet from the spider, each bucket verges to a conformation with the area of its outlet and base of attachment. In order to equalize the capacity of the buckets of the inner series with those of the outer, which have a higher velocity, they are made proportionately larger, and the inlets are extended a proportionately greater distance from the spider. By dividing the concentric areas between the rims A it is manifest that the sizes of the buckets may be progressively diminished from the center outward in proportion to their greater velocity, and that in this manner and by projecting the inlets of the inner series to proportionately greater distances from the plane of revolution of the outer series the buckets of the several series may be approximately equalized in capacity, and that a substantially uniform volume of gases, commensurate with the area of the propeller under uniform pressure, will be discharged from the propeller at right angles to the plane of its revolution, thereby intercepting the radial and preventing the vortex or reverse currents incident to fan-propellers. By extending the inlets of the buckets of the inner series revolving at reduced velocity to a plane beyond those revolving at higher volocity each series of buckets revolves in a separate stratum of gases, and thereby insures an unobstructed inflow to each series. The arbor is supported in suitable bearings (not shown) and the propeller can be housed in a metal casing or secured in a circular arched opening formed within the area of a wall, as desired.

In operation the radial currents of air induced by the revolving of the propeller are intercepted by the buckets and are discharged at right angles to the plane of its revolution, and by providing two or more concentric series of buckets the noise produced by high rotative velocity is reduced to a minimum.

What I claim is—

1. An air-propeller, comprising a driven arbor having mounted thereon a spider, a plurality of concentric rims secured to the spider, two or more concentric series of buckets secured to the spider and the rims, curving outward and forward in the plane of rotation, and forming shoulders for intercepting the radial flow of gases and discharging the same in a plane at right angles to that of rotation.

2. An air-propeller, comprising an arbor having mounted thereon disks adapted to secure radial arms, two or more concentric rims secured to the arms, other radial arms secured to the rims, whereby there are formed two or more series of concentric segments, increasing in number in each series, but decreasing in area from the center toward the periphery, and buckets secured to the arms, rims, and disks, the inner concentric series of buckets extending to a plane beyond the outer series of buckets, so as to have a capacity proportioned to their velocity.

3. An air-propeller, comprising an arbor having mounted thereon a spider, and two or more concentric series of buckets secured to the spider, the buckets of the successive series increasing in capacity and diminishing in number from the periphery inward proportionally to the radial velocity of each series.

ANDREW DUFFNER, JR.

Witnesses:
HERMAN H. MARTIN,
FRANKLIN L. MACOMBER.